Oct. 9, 1945.   W. LEATHERS ET AL   2,386,482
DATA STORING DEVICE AND SELECTING MEANS THEREFOR
Filed Jan. 27, 1943   4 Sheets-Sheet 1

INVENTORS:
Ward Leathers,
Jerrier Haddad.
BY
ATTORNEY

Oct. 9, 1945.   W. LEATHERS ET AL   2,386,482
DATA STORING DEVICE AND SELECTING MEANS THEREFOR
Filed Jan. 27, 1943   4 Sheets-Sheet 2

Fig. 2

INVENTORS:
Ward Leathers,
Jerrier Haddad.
BY
ATTORNEY

Patented Oct. 9, 1945

2,386,482

UNITED STATES PATENT OFFICE 2,386,482

DATA STORING DEVICE AND SELECTING MEANS THEREFOR

Ward Leathers and Jerrier Haddad, Brooklyn, N. Y., assignors to International Business Machines Corporation, New York, N. Y., a corporation of New York Application January 27, 1943, Serial No. 473,723

1 Claim. (Cl. 235—61.6)

The present invention relates to accounting machines and more particularly to a machine for use in a system utilizing perforated records for compiling accounting data according to a selected code. Essentially, the invention is concerned with a translating machine whereby information contained on a record media, which may be in the form of a perforated tape, is used as a basis for numerous computations of an accounting nature and the computed data automatically recorded on a second record media, which also may be in the form of perforated tape. The apparatus is particularly useful in connection with that type of accounting wherein electric current consumption or gas consumption is charged for according to a sliding scale rate with numerous additional charges, such as fuel adjustment and tax charges, being involved in the transactions. The invention, however, is useful in other regards and the same may, with or without modification, be employed in connection with various sales, market and other transactions, whether financial or otherwise. Irrespective, however, of the specific use to which the invention may be put, the essential features thereof are at all times preserved.

The principal object of the invention is to provide an accounting machine of the character set forth above wherein certain selected pre-computed data, as derived from an initial set of figures, for example, the ten digits of the Arabic system, may be set up electrically in the machine and wherein the precomputed data may automatically be selected as one or more of the figures are received by the machine according to the initial data material and the resultant data suitably recorded by a series of perforating or printing operations on a record media, which, in the case of perforating operations, may be tape or the like.

In carrying out the above mentioned object, the initial data received by the machine may be received as figures of the Arabic system or as code characters, and likewise the precomputed data derived therefrom may be set up according to Arabic or code characters. Similarly, the ultimate recorded data may be printed on the record media in Arabic characters or it may be perforated on the media according to a selected code, which may be the same or a different code from that employed for the original data. For simplicity of operation, as well as for simplicity in equipment, the invention has been illustrated herein in the form of an accounting machine wherein the initial data is received in the form of a simplified four-line code, the precomputed data set up according to that code, and the result also perforated on the record media according to the same code.

Heretofore, apparatus for the electrical storage of predetermined data has been relatively complicated and has operated upon electrical principles requiring an unduly large amount of electrical equipment. For example, one type of apparatus for this purpose, which is capable of receiving only ninety-nine initial data figures and of electrically translating the same into a predetermined code, has required for its successful operation a minimum of two-hundred and ten magnets together with numerous clutches, by means of which certain rotatable data storing devices are selectively operated. For successful operation of the apparatus to accommodate additional initial data figures, an increase of equipment in practically direct proportion to the number of initial data figures is required with the net result that where it is desired to accommodate as many as one-thousand data figures, the cost of equipment, as well as the complexity and bulk thereof, is prohibitive. The present invention is designed to overcome the above noted limitations of excess electrical and mechanical equipment and, toward this end, contemplates the provision of an apparatus where, because of the simplified code chosen for its operation and because of other considerations, it is capable of receiving large numbers of initial data figures or characters, of translating the same and of recording the translated data with a minimum amount of equipment. Where additional data figures or characters are to be accommodated, the present invention is so designed that the first additional one-hundred initial data figures requires only the addition of but a pair of relay circuits involving two magnets with an additional magnet being required for each one-hundred of further initial data up to a thousand.

It is another object of the invention to provide an apparatus of this character wherein the precomputed data is adapted to be set up in a series of relay-controlled translating units by means of settable pins which are adapted to cause certain electrical circuits to be closed upon proper selection of the unit in which they are employed.

A similar object of the invention is to provide an apparatus employing a series of such translating devices arranged for electrical selection and wherein the devices are normally electrically isolated one from another in such a manner that undesirable feedback between the devices resulting from cross-selection thereof is effectively avoided.

Another object of the invention is to provide an apparatus having data storing means for the electrical storage of data which is characterized by the absence of selectively operable rotary storage drums which are frequently resorted to for the electrical storage of data in apparatus for accomplishing the same purpose.

Yet another object of the invention is to provide an apparatus having data storing units as outlined above and wherein means are provided for manually altering the character of the data which may be stored in the apparatus without requiring special tools and without disassembling any portion of the apparatus and without altering existing electrical circuits associated with the machine.

Other objects and advantages of the invention not at this time enumerated will become more readily apparent as the nature of the invention is better understood.

In the accompanying four sheets of drawings, one embodiment of the invention applicable to public utility accounting has been disclosed. In these drawings.

In all of the above described views similar characters of reference are employed to designate similar parts throughout.

BRIEF DESCRIPTION

Figures 1, 4, 5, 10:
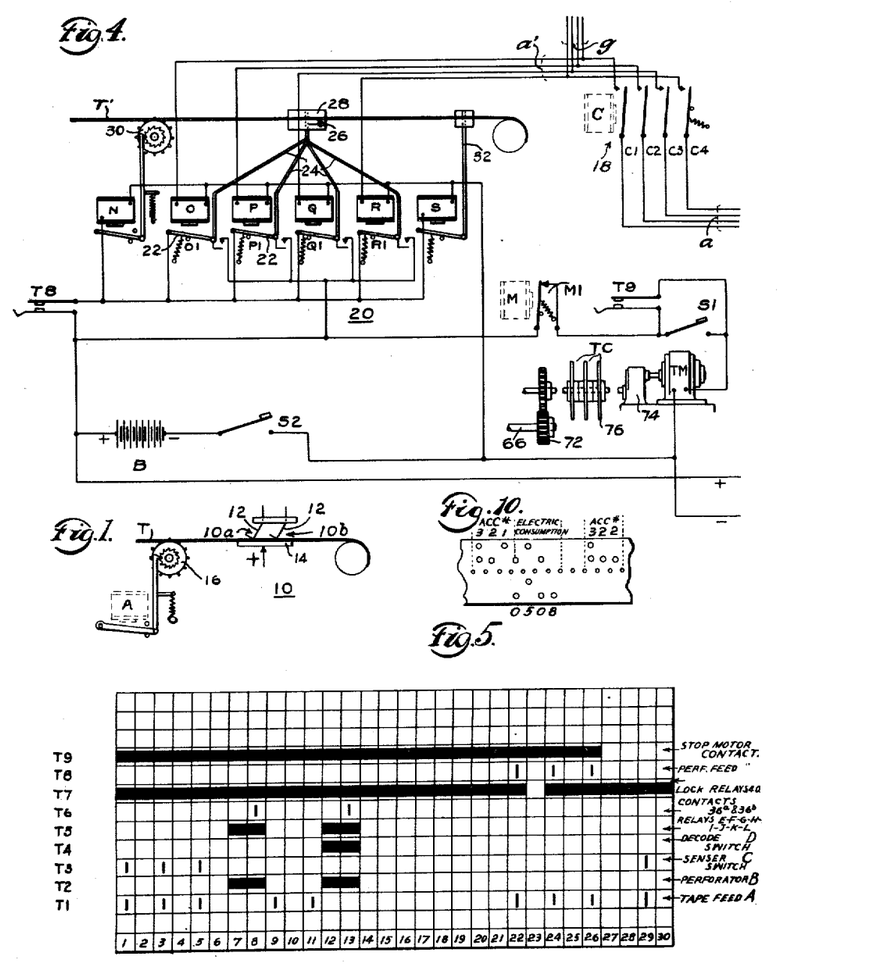
Fig. 1 is a fragmentary, side elevational view, somewhat diagrammatic in its representation, of a tape driving mechanism employed in connection with the present invention.
Figs. 2, 3 and 4 are partial diagrammatic views which, when considered collectively, constitute an electric circuit diagram of the invention.
Fig. 5 is a diagrammatic time chart representing the operation of the apparatus on a fractional cycle basis.
Fig. 10 is a fragmentary plan view of a strip of tape perforated in accordance with public utility accounting procedure.

In the accompanying drawings, the invention has been shown in the form of an apparatus which is useful in connection with public utility accounting and specifically where electric current consumption is charged for according to a sliding scale rate. In such instances, numerous additional charges, such as fuel adjustment and tax charges, are involved in the transactions, while at the same time each individual account is identified by means of an account number. In the present instance, the apparatus is designed to accommodate an account identification number consisting of three digits and a consumption figure consisting of four digits, while in the computed rates the apparatus will accommodate a figure of five digits representing actual dollars and cents. In Fig. 10 a fragment of a strip of tape which has been perforated according to public utility accounting procedure represents the account number and consumption figure of a single customer together with the account number of the next succeeding account customer. The account numbers contain three digits and identify the customers. Consumption figure is expressive of kilowatt hours of electric current consumed and is comprised of four figures.

Figure 2:
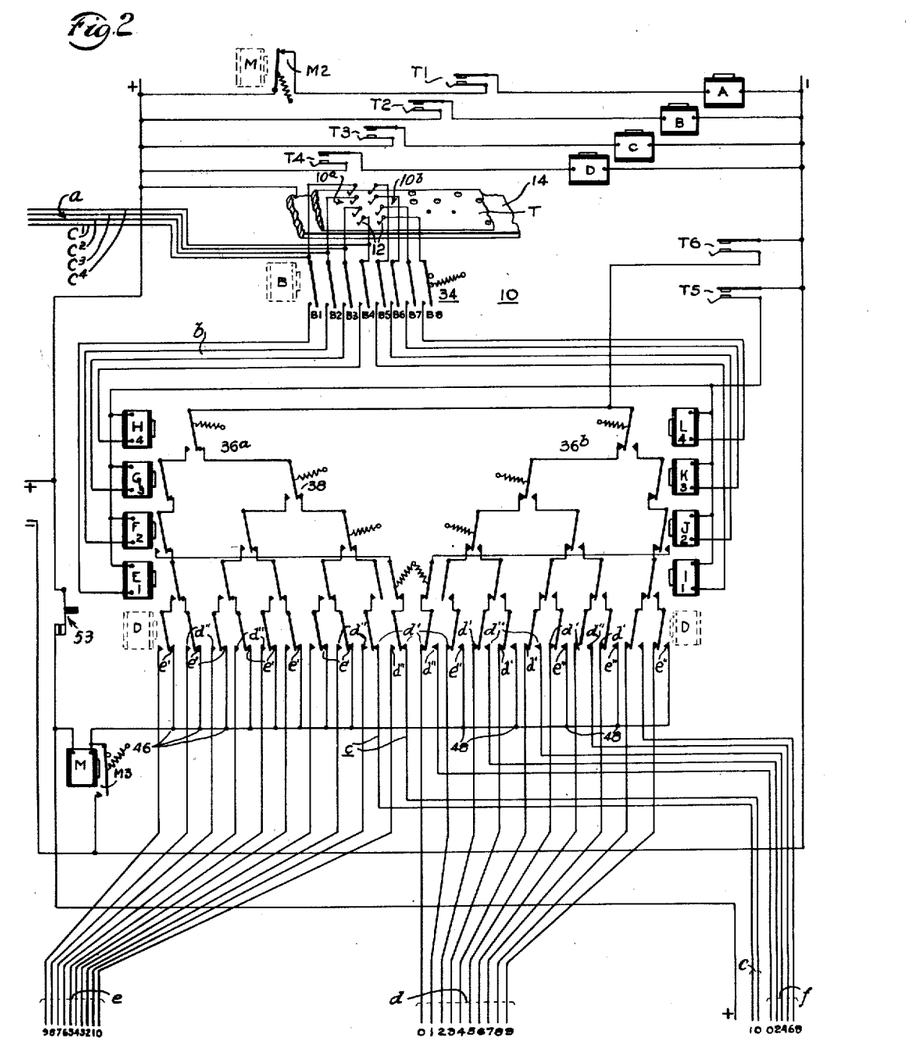
Figure 3:
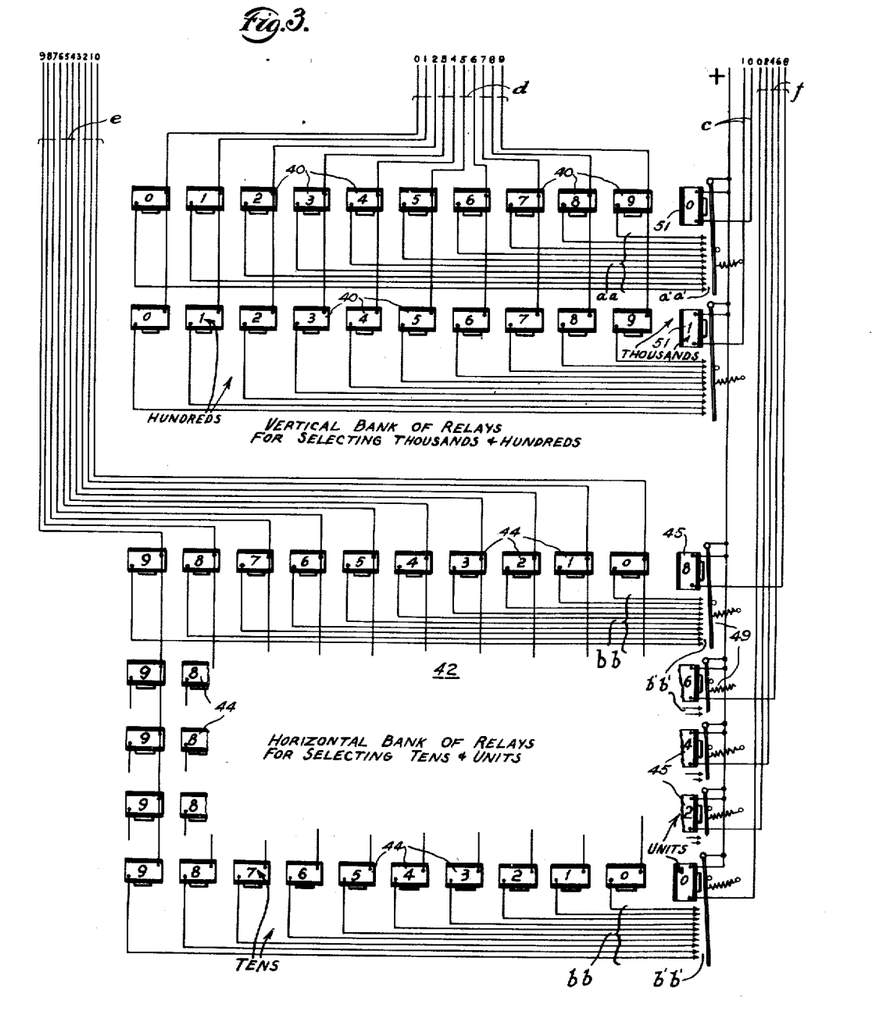

Referring now to the drawings in detail, and particularly to Figs. 2, 3 and 4, original or initial data representing an account number, together with its attendant consumption figure, is presented to the apparatus at the input thereof in the form of a perforated data-bearing accounting tape which is received in the apparatus by means of a sensing device including first and second rows of sensing brushes beneath which the tape is fed in a step-by-step fashion. The data appearing on the tape is in the form of a series of perforations which occur at various index point positions of the tape. In the output region of the machine the apparatus includes a recording device in the form of a tape perforating apparatus, by means of which the various transactions are recorded in dollars and cents on a second recording tape. During the initial phases of operation of the apparatus means are provided for connecting the first of the two sensing units or rows of brushes directly to the perforating apparatus for direct application to the recording tape of the initial account number comprising three digits in the selected code just as it is received by the apparatus during the first three stepping or indexing operations of the tape. Thereafter, the accounting tape is advanced one step in the sensing apparatus and both rows of brushes in the dual sensing mechanism are caused to operate through respective decoding mechanisms to select for energization one of a series of control magnets in a vertical bank or series thereof included in a data storing and selecting mechanism, the selection being made according to the hundreds and thousands digits of the consumption figure carried on the initial account tape. Immediately after selection of one of the magnets in the vertical bank of magnets in the data storing mechanism, the account tape is again advanced two steps in the sensing device and both rows of brushes in the latter are caused to operate through their respective decoding devices simultaneously to make selection for energization of a single magnet in a horizontal bank or series thereof in the data storing and selecting mechanism, the selection being made according to the tens and units digits of the consumption figure. The single selected magnet in the vertical bank thereof and the single selected magnet in the horizontal bank thereof cooperate with each other in making selection of the precomputed data which is stored electrically in a data storing mechanism and which has been computed according to the consumption figure appearing on the account tape. After selection of the precomputed data has been made, the perforating mechanism operates to perforate this data on the final recording tape and the apparatus then completes another cycle of operation for the next account. Control of the operation of the apparatus is effected by means of a timing apparatus which operates by means of cams to effect the various machine functions and which continues to function indefinitely and carry the apparatus through the sequential cycles of operation until such time as its control motor is stopped.

Briefly, the present apparatus is capable of reading tape-bearing consumption designations for values of from 0 to 1999 which are representative of kilowatt hours of consumed electric current, and of punching a new tape with appropriate charge values for the above range of consumption figures. The apparatus provides 2,000 storage devices arranged in a bank and into which the consumption figures or charges are manually represented or preset, as will be substantially described in connection with Figs. 6, 7 and 8. The individual storage devices are selected by two sets of electromagnets 40 and 44, the magnets 40 being arranged vertically along the bank, while the magnets 44 are arranged horizontally therealong. The selection of the storage devices is effective by cross energization of magnets, one in each line.

The four digits of the multi-digit consumption figure are read in pairs; first, the two higher order digits are read and one magnet 40 is selected by a circuit which is shown in Fig. 2 and in the upper half of Fig. 3, then the two lower order digits of the consumption figure are read and a magnet 44 is selected in accordance therewith. In selecting a magnet 40, magnets 51 are energized in accordance with the highest digit of the consumption figure. Since the consumption figure is limited to amounts which are below 2,000 only, two of the magnets 51 are employed and these magnets have been designated at 0 and 1 in Fig. 3. These latter magnets determine in which horizontal line of magnets 40 (Fig. 2) a given magnet may be selected in accordance with the next lower or hundreds consumption digit. Similarly, a magnet 44 is selected by energizing a magnet 45 in accordance with the units order of the consumption figure, this latter magnet determining in which particular horizontal line of magnets a magnet 44 will be selected in accordance with the next higher or tens digit of the consumption figure. Since consumption figures are represented by even numbers, only five magnets 45, labeled 0, 2, 4, 6 and 8 are utilized.

Thus a selected magnet 40 represents the number of hundreds in a given consumption figure, while selected magnet 44 represents the number of units in the consumption figure. Accordingly, the storage bank of the present invention comprises twenty horizontal lines and fifty vertical lines of storage devices or a total of 1,000 thereof.

The sensing apparatus

Referring now to Figs. 1 and 2, wherein the sensing apparatus is more or less diagrammatically shown, this apparatus is designated in its entirety at 10 and includes a number of sensing brushes 10a and a similar number of sensing brushes 10b, the individual brushes being designated at 12 and there being four brushes in each number. The sensing apparatus also includes a conventional sensing platen 14. The initially perforated record tape T upon which the various three-digit account numbers, together with their respective four digit consumption figures, have been perforated is passed between the brushes 12 and platen 14 of both rows in step-by-step fashion by means of a conventional ratchet-controlled tape advancing wheel 16, the operations of which are controlled by means of a timer-controlled electromagnet A, whose energization is effected through a pair of contacts T1. The sensing mechanism 10 is more or less conventional in its design and no claim is made herein to any novelty associated therewith.

The brushes 12 of the first row 10a are connected by a group of wires a through four normally open contacts C1, C2, C3 and C4 (Fig. 4) of a relay 18 to a recording apparatus 20 in the form of a perforating device, the nature of which will be set forth presently. The brushes of the second senser have no such direct connection to the perforator. The relay 18 includes a timer-controlled electromagnet C whose energization is effected through a pair of contacts T3.

The perforating mechanism

The perforating mechanism 20 is similarly more or less conventional in its design and includes a series of perforating magnets O, P, Q and R, each having associated therewith an armature controlling a thrust rod 24, which in turn serves to operate a punching die 26, the die 26 cooperating with a die block or platen 28 for perforating the final record tape T' in the various index position points thereof. The magnets O, P, Q and R are connected through the contacts C1, C2, C3 and C4 respectively of the relay 18 by their respective wires a' and a to the brushes 12 of the first sensing device 10a. The magnets O, P, Q and R, in addition to controlling the movements of their respective thrust rods 24, also serve to close a series of contacts O1, P1, Q1 and R1 respectively, by means of which circuits are closed to simultaneously energize a pair of magnets N and S. The magnet N serves after initial energization and subsequent deenergization thereof to operate a ratchet-controlled tape advancing wheel 30, while the magnet S serves to actuate a punch 32 for applying center drive hole perforations to the tape T'.

Referring now to Fig. 2, an eight-contact relay 34, including pairs of contacts B1, B2, B3, B4, B5, B6, B7 and B8, is controlled by means of a timer-controlled electromagnet B, whose energization is effected through a pair of contacts T2. The contacts B1, B2, B3 and B4 are electrically connected to the brushes 12 of the first row of brushes 10a, while the contacts B5, B6, B7 and B8 are electrically connected to the brushes 12 of the second row 10b. All of the contacts are normally open and are adapted to become simultaneously closed upon energization of the timer-controlled magnet B. The contacts B1, B2, B3 and B4, when closed, are adapted to connect the brushes 12 of the first senser through a group of wires b to respective magnets E, F, G and H included in a first decoding device 36a, while the contacts B5, B6, B7 and B8, when closed, are adapted to electrically connect the brushes 12 of the second senser to a series of magnets I, J, K and L included in a second decoding device 36b. A pair of timer-controlled contacts T5 serve at the proper time to close the common return wire leading from all of the magnets of the two decoding devices 36a and 36b, to the negative power line. The output circuits of the two decoders are controlled by a pair of timer-controlled contacts T6. It will be seen that when the various contacts B1 to B8 inclusive are in their normally open position, both the first and second decoding devices 36a and 36b are disconnected from the sensing mechanism 10. The first row of brushes 10a of the sensing mechanism are directly connected through the previously mentioned group of by-pass wires a to the relay 18, which when closed operatively connects them to the perforating mechanism 20.

As previously stated, the first row of sensing brushes 10a is adapted to be connected through the group of by-pass wires a to the perforating device 20 only during direct recording of the first three figures on the tape T which represent an identifying account number. Thereafter, during sensing of the consumption figures on the tape T, the magnet B is adapted to become energized to connect the first and second rows of brushes 10a and 10b to the first and second decoders 36a and 36b. The decoding devices 36a and 36b are more or less conventional and are of the type commonly known as Baudot type decoding mechanisms and each includes a plurality of two-way switch contacts 38 arranged in pyramidal fashion and in series. The output of each decoding device terminates in ten such two-way switch contacts, each representing a numeral in the Arabic system.

*The selecting mechanism*

Figures 6, 6A, 7, 8:
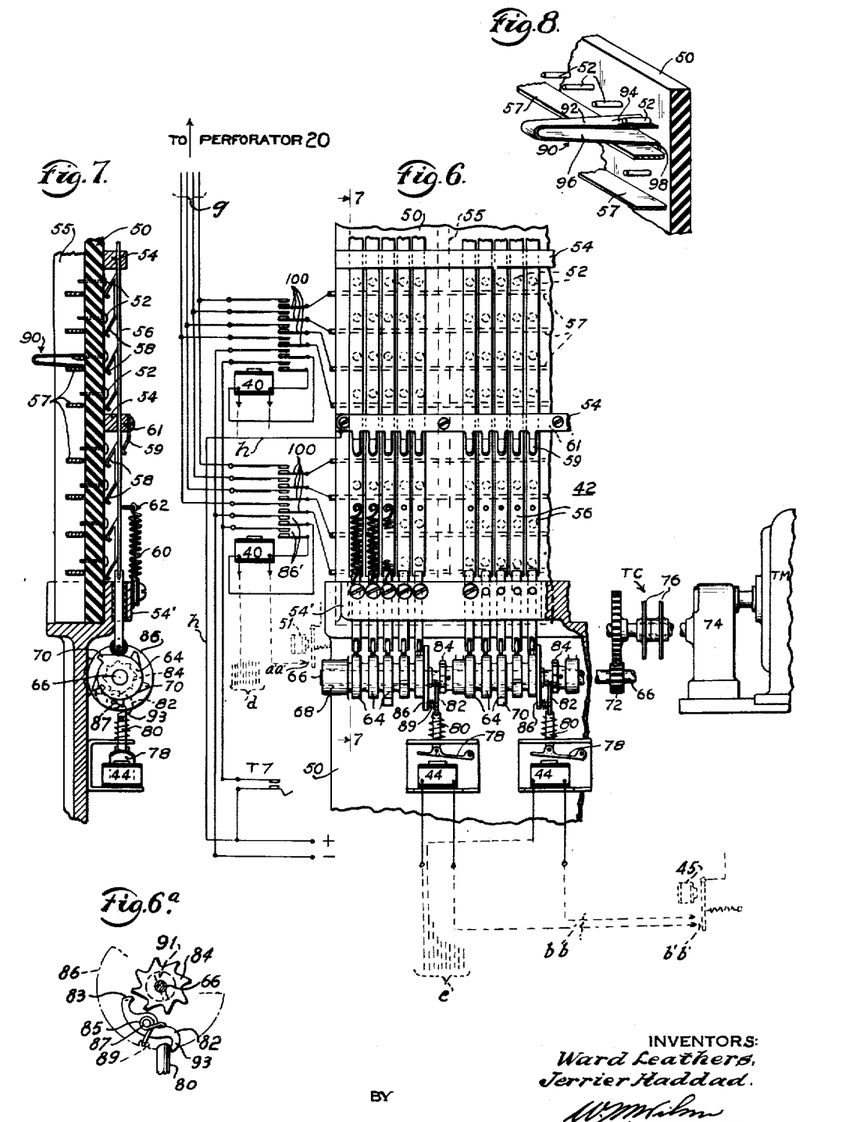
Fig. 6 is a diagrammatic view of a data storing device employed in connection with the present invention.
Fig. 6a is a fragmentary perspective view of a one-revolution clutch employed in connection with the present invention.
Fig. 7 is a sectional view taken substantially along the line 7—7 of Fig. 6.
Fig. 8 is an enlarged fragmentary perspective view of a portion of the data storing device shown in Figs. 6 and 7.
Figure 9:
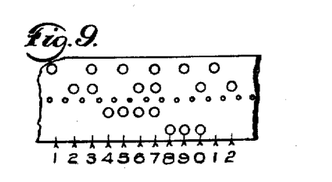
Fig. 9 is a fragmentary plan view of a record media illustrating a specific code employed in connection with the present invention.

Referring now to Fig. 3 wherein the selecting mechanism is shown in detail, this mechanism involves in its general organization a group of twenty magnets 40 and a second group of fifty magnets 44. The disclosure of the magnets 40 and 44 in this figure is purely diagrammatic to illustrate the electrical arrangement thereof and the manner by means of which they may be selected for operation. As shown in Fig. 6, the magnets 40 are contact closing relay magnets, the function of which is to close respective contact groups 100 associated with a data storing device 42. The purpose of the magnets 44 is to actuate a series of one-revolution clutches 84, the function and nature of which will become apparent presently.

The magnets 40 are arranged electrically in two banks as shown, each bank thereof having associated therewith wires aa leading to groups of relay controlled contacts a'a'. The circuits represented by the wires aa and contacts a'a' remain normally open but are adapted to become simultaneously closed in unison by the armatures of a pair of electromagnets 51, each of the latter magnets serving one of the banks.

The fifty magnets 44 are arranged in five banks as shown and each bank has associated therewith a group of wires bb leading to respective contact groups b'b'. The individual contact groups b'b' are adapted to become closed by respective armatures of a series of five electromagnets 45 similar in function to the electromagnets 51. By such a normally open circuit arrangement, objectionable feedback, so common in connection with electrical cross-selection of circuits, is avoided.

It should be borne in mind that the description just made of the arrangement of magnets 40 and 44 does not show the actual physical positioning of these magnets. As indicated by the legending in Fig. 3 and as shown in Figs. 6 and 7, the magnets 40 may be physically positioned in line to constitute a vertical bank of relays which are operated according to the thousands and hundreds digits of the consumption figure. Similarly, the magnets 44 may be situated in line and are adapted to be actuated according to the tens and units digits of the consumption figure.

Referring now to Figs. 2 and 3, two wires c lead from respective contacts d' operatively associated with the output circuits of the decoder 36a to the magnets 51 associated with the vertical bank of relays. Ten wires d lead from other contacts d' operatively associated with the decoder 36b to the magnets 40. It is to be noted that these latter magnets 40 are electrically connected together in pairs, as shown in Fig. 3.

Five wires f lead from respective contacts d'' associated with the decoder 36b to the magnets 45. Ten wires e lead from other contacts d'' associated with the decoder 36a to the magnets 44. It is to be noted that these latter magnets are electrically connected together in parallel and in groups of five, as shown in Fig. 3.

After the operation of sensing the third identifying or account number figure on the tape T by the first row of brushes 12 and recording the same on the tape T', the tape T is advanced one step in the senser 10 to a position wherein the thousands and hundreds digits of the consumption figures are presented for sensing to the first and second rows of brushes 12 respectively. With the tape in this advanced position, the magnet B is adapted to become timer-energized, whereupon all of the contacts B1 to B8 inclusive of the relay 34 become closed, thus connecting the two sensers 10a and 10b to their respective decoding devices 36a and 36b. Upon sensing of the thousands and hundreds digits by the first and second senser respectively, a single magnet in the vertical bank 40 is selected for energization and the selected magnet thus represents the combined thousands and hundreds digits of the consumption figure when considered in their proper decimal relation to each other.

The reason for including only twenty magnets 40 in the vertical bank of magnets and for arranging them electrically in two horizontal groups, as shown in Fig. 3, is that the present apparatus has been illustrated in connection with public utility accounting wherein the highest figure encountered for billing purposes in dollars and cents is seldom greater than five figures. The two wires c previously mentioned are sufficient to accommodate figures within this limit. The other eight wires leading from the contacts e' of the decoder 36a are connected together in common as at 46 in Fig. 2 and are connected to a magnet M, which serves to open a local motor circuit by means of which a timing motor TM is energized to control the operation of the various timing contacts T1 to T6 inclusive and additional timer contacts subsequently to be set forth.

The reason for employing only fifty magnets 44 in the horizontal bank of magnets is that in public utility accounting of this sort customers are billed according to kilowatt hours expressed in even digits only. Accordingly, alternate wires e'' leading from the contacts d' of the decoder 36b are connected together as at 48 in common and are connected to the magnet M. Any or all of the contacts d' of the two decoders which are not used for decoding purposes are available, if desired, to accommodate conditions where it is desired to increase the capacity of the apparatus or where an odd units digit appears in the consumption figure.

The magnet M is employed simply as a precautionary measure and in case of an error wherein an odd number of kilowatt hours is recorded or wherein an exceedingly high consumption figure is encountered, the magnet M will serve to open the pair of contacts M1 (Fig. 4) and deenergize the motor TM at the end of the particular cycle of machine operation. When this occurs, the operator of the machine may make suitable correction or notation in any desired manner. Upon energization of the magnet M, a pair of normally closed contacts M2 are adapted to become immediately open, thus rendering the contacts T1 ineffective during the remainder of the rotation of the timing drum. In this manner no sensing operations will take place, even though the tape is removed from the machine by the operator.

The circuit of the motor TM in addition to including the contacts M1, also includes a manually operable switch S1 which, if closed, will cause the apparatus to function indefinitely, but which if open will cause termination of the apparatus at a predetermined time in the cycle. The magnet M has associated therewith a pair of locking contacts M3 operable to maintain the magnet energized after it has received an initiating impulse.

After the operation of sensing the thousands and hundreds digits of the consumption figure, the tape T is advanced two steps in the senser 10 to a position wherein the tens and units digits of the consumption figure are presented for sensing and with the first senser 10a and its decoder 36a accommodating the tens digits and the second senser 10b and its decoder 36b accommodating the units digit of this figure. The operation of the first and second sensers 10a and 10b respectively and their corresponding decoding devices 36a and 36b remain substantially the same as when the thousands and hundreds digits of the consumption figure undergoes sensing, except for the timer controlled energization of an electromagnet D whose operation is controlled by means of a pair of contacts T4. Upon energization of this latter magnet, the output circuits of both decoders 36a and 36b are shifted and the two decoding devices are connected through the groups of wires e and f respectively to the various magnets 44 in the horizontal bank and the circuit closing magnets 45 associated with this latter bank.

The data storing device

Referring now to Figs. 6 and 7 wherein a fragmentary portion of the data storing mechanism 42 is shown in detail, the mechanism involves in its general organization a control board or grid 50, through which there projects a series of contact pins 52 arranged in vertical and horizontal rows. Suitably supported and anchored in a series of vertical supports 55 are a plurality of contact bars 57 which are adapted to cooperate with the contact pins 52 for circuit closing purposes. Slidably mounted in brackets 54 suitably secured to the board 50 are a series of vertically reciprocable contact bars 56, the bars being arranged in groups of five each, as shown in Fig. 6. Each of the bars 56 is provided with a series of outwardly struck offset spring contact fingers 58 corresponding in number to the number of pins 52 provided in each vertical row thereof. The bars 56 are normally maintained in their retracted or lowermost positions by means of coil spring 60 anchored at their lower ends to a guide bar 54' and at their upper ends to pins 62 projecting outwardly from the respective bars 56. The bars 56 of each group of bars are adapted to be successively actuated by means of a series of cooperating rotary cam members 64 loosely mounted on a horizontal shaft 66. The shaft is rotatably supported in bearings 68 adjacent the lower edge of the board 50. Each of the members 64 is formed with a cam projection 70 at its periphery and the various cam projections 70 are staggered relative to one another around the peripheries of the various members 64 in order that the bars 56 of each group shall, upon rotation of the members 64 in unison, be actuated successively from left to right, as viewed in Fig. 6 of the drawings. The shaft 66 (see also Fig. 4) is driven through a pair of cooperating gears 72 from the motor TM, the motor having associated therewith suitable reduction gearing mechanism 74. Interposed between the reduction mechanism 74 and the gears 72 are a series of timer cam wheels 76 of which there are nine in number and each of which serves to control one of the pairs of contacts T1, T2, T3, etc., previously referred to. The nature of the gears 72 is such that a 3-to-1 step-up ratio exists between the timing cam wheels 76 and the shaft 66. The vertical bank of magnets designated generally at 40 in Fig. 3 is shown at the left-hand side of Fig. 6 and the horizontal bank of magnets 44 appearing in Fig. 3 is shown at the bottom of Fig. 6, the two banks of magnets being arranged for cross-selection of the stored data, as will become more readily apparent.

Each of the magnets 44 serves to control the movements of an armature 78 to which there is pivoted a connecting rod 80, by means of which a stop pin 80 forming part of a one-revolution clutch 84 is projected or retracted. Upon selection of one of the magnets in the bank 44 for energization, the stop pin 80 of a respective one-revolution clutch 84 is moved to its retracted position, thus allowing the clutch to become operative and causing the various cam members 64 to rotate and successively actuate the bars 56 of the corresponding group of bars.

The one-revolution clutch is illustrated in detail in Fig. 6a and comprises a toothed member or ratchet wheel 84 suitably secured to and rotatable with the shaft 66. A disc 86 mounted on the shaft 66 and coupled to the cam 64 carries a stud 87 to which there is pivoted medially of its ends a pawl member 82. The member 82 is provided with a pawl projection 83 designed for successive engagement with the teeth provided on the ratchet wheel 81. A second projection 93 on the pawl member 82 projects into the path of movement of a stop pin 80 and is adapted to be engaged by the latter to stop rotation of the disc 86 and consequently of the entire moving clutch mechanism. Upon retraction of the stop pin 80 a coil spring 89 which surrounds the stud 87 and bears against the pawl member 82 causes the pawl projection 83 to engage the teeth of the ratchet wheel 84. When this occurs the disc 86 and consequently the entire moving clutch mechanism accomplishes one complete revolution prior to the time the projection 83 again engages the stop pin 80 which during revolution of the clutch mechanism is restored to its normal position by its controlling magnet.

The magnets of the bank 40 have associated therewith pairs of locking contacts 86', the function of which is to hold the magnets 40 energized until such time as they are released by one of the timing devices 76 operating through a pair of contacts T7. A conductor bar 61 extends horizontally across the board 50 at the rear thereof, is suitably supported thereon, and serves in turn to support a plurality of spring brush members 59 which bear inwardly against the movable bars 56 and serve to connect these latter bars to the bar 61. The bar 61 thus constitutes a common connection for all of the bars 56 and, toward this end, a wire h is electrically connected to the bar 61 and leads to the positive current source. Referring now to Fig. 8, it will be seen that means are provided in the form of a series of relatively small U-shaped spring clips 90 for selectively and temporarily connecting the various pins 52 in the horizontal rows thereof to an adjacent conductor bar 57 and by such selective connection various data may be stored in the apparatus. The clips 90 each include a leg 92 having a trough 94 formed therein, the walls and bottom of which are adapted to bear against the inner side of one of the pins 52 when the clip is in position. The other leg 96 of the clip is formed at its extreme end with an outwardly turned flange 98 adapted to underlie one of the conductor bars 57 and prevent dislodgment of the clip, the two legs 92 and 96 of the clip bearing outwardly against the pin 52 and bar 57 by a spreading action, thus making electrical contact with each of these elements and serving to electrically connect the two together. The horizontal contact bars 57 are arranged in groups of four according to the selected code and each group thereof is connected through a group of contacts 100 to a group of wires g leading to the perforator 20 (see Figs. 4 and 6) and which group of wires constitutes a common connection for the respective contacts 100 of each group thereof.

The selected magnets 40 in the vertical bank thereof are adapted to become energized slightly in advance of energization of the selected magnet 44 in the horizontal bank of magnets, and thus all the contacts 100 of a single selected group of live contacts will become closed simultaneously prior to release of the selected one-revolution clutch 82. Upon release of this clutch the various cam members 84 will be thrown into operation and will function successively to elevate the bars 56 of the selected group in order to connect all of the contact pins 52 in each vertical row of the group together in common successively. The actual movement of the bars 56 performs the final circuit closing operations, and thus when the brushes 58 simultaneously move into engagement with the contact pins 52 in the respective vertical rows, electrical circuits representing the figures which are to be perforated by the apparatus 20 are closed and these figures are perforated successively and in decimally correct order.

*Timer-controlled operation of the apparatus*

In Fig. 5 the operation of the apparatus is diagrammatically illustrated in the form of a fractional cycle time chart, in which thirty time increments or index positions totaling one complete cycle of machine operation are provided. Upon closing of the master switch S2, current for driving the motor TM and for other operations is made potentially available. Upon closing of the switch S1, the motor circuit is completed and rotation thereof commences, while at the same time rotation of the various timing devices 76 are set into operation. Upon commencing a machine cycle, the pair of control contacts T9 become closed, thus effectively maintaining the circuit closed regardless of the position of the switch S1.

Shortly after closing of the contacts T9, the pairs of contacts T1 and T3 become closed three times each and in quick succession, whereupon the relay magnets A and C become impulsed correspondingly in order to perforate the three identifying numerals on the tape T', as previously described, and also to advance the tape T after perforation of the tape T' takes place. The latter function takes place by virtue of the ratchet mechanism 30 which functions upon deenergization of the magnet A.

After perforation of the three identifying numerals and advancement of the tape T, the tape T assumes a position wherein the thousands and hundreds digits come under the influence of the sensing devices 10a and 10b respectively. At this stage of operation the pairs of contacts T2 and T5 become closed, whereupon the decoding devices 36a and 36b are operatively energized. Upon closing of the contacts T6, the common line for the various work circuits of the decoding devices becomes operatively connected to the negative power line. Circuits are then completed through the groups of wires c and d, whereupon one of the twenty magnets 40 in the vertical bank thereof is energized and locked and maintained energized by virtue of the closing of the pair of contacts T7.

Shortly thereafter, the pairs of contacts T2, T5 and T6 become open, thereby deenergizing the two decoding devices. The contacts T1 again become energized, momentarily, two times in succession and the tape T is thus advanced two index point positions so that the tens and units digits of the consumption figure come under the influence of the senser brushes 12.

Upon closing of the contacts T2, T4 and T6, the decoding devices are again energized, while at the same time the magnet D is energized to reverse the position of the contacts d', d'', and cause selection of one magnet 44 of the horizontal bank of magnets through the wires e and f instead of through the wires c and d. Thus, the respective one-revolution clutch is allowed to turn and the various shiftable bars 56 are successively shifted to close their corresponding circuits in the manner previously described. During this portion of the machine cycle the data which has been precomputed and stored in the selected unit of the device 42 is applied to the tape T'.

Immediately after application to the tape T' of the precomputed data, the pair of contacts T7 become open, thus allowing the various selected magnets of the device 42 to become deenergized and unlocked, and thereafter the contacts T1 and T8 become closed three times in succession to cause spacing of both tapes T and T' preparatory to commencement of the next machine cycle.

The apparatus will continue to function until such time as the switch S1 is manually opened, at which time opening of the pair of contacts T9 will cause the motor TM to become deenergized. The first and second, and the twenty-sixth and thirtieth cycle fractions indicated on the time chart of Fig. 5 represent a period of time allotted for the inertia of the motor TM in the starting and stopping thereof.

During operation of the apparatus, should an over consumption be encountered or should an error appear in the initial tape whereby an odd number of kilowatt hours are presented, the magnet M will become energized and locked, thus opening the contacts M1 and stopping the machine as previously described. The operator will in such an instance open a manually controlled switch S3 to deenergize the magnet M, after which he may remove the erroneous section of the tape from the sensing device and properly position the tape representing the next succeeding account in the apparatus for processing purposes. In so adjusting the tape, it will be understood that the operator will line up the same before machine operations are started so that the highest digit of the account number is in register with the first row of brushes 12. Subsequently, the switches S1 and S3 will be manually closed to set the machine into operation.

The invention is not to be limited to the exact arrangement of structure shown in the accompanying drawings or described in this specification as various changes in the details of construction may be resorted to without departing from the spirit of the invention. Only insofar as the invention has particularly been pointed out in the accompanying claim is the same to be limited.

What is claimed is:

In an apparatus for selecting stored data which is computed according to a prearranged schedule for a plurality of multi-digit numbers, a plurality of work circuits, a plurality of data storing devices each having means for storing data according to the prearranged schedule and corresponding to one of said numbers, said devices being arranged for cross-selection in vertical and horizontal rows, selecting means including a horizontal bank of electromagnets for selecting a vertical row of said devices and a vertical bank of electromagnets for selecting a horizontal row of said devices, said horizontal bank of magnets being arranged electrically for cross-selection in groups and said vertical bank of magnets also being arranged electrically for cross-selection in groups, means for reading the initial multi-digit members, means controlled by said reading means for selecting a magnet in one of said banks according to two high decimal order digits of the number read by the reading means, means for selecting a magnet in another of said banks thereof according to two digits of relatively lower decimal orders of the number read, and means for selectively closing said work circuits in accordance with the precomputed data stored in the device which is selected by virtue of cross-selection by the selected magnets in each group.

WARD LEATHERS.
JERRIER HADDAD.

CERTIFICATE OF CORRECTION.

Patent No. 2,386,482.　　　　　　　　　　　October 9, 1945.

WARD LEATHERS, ET AL.

It is hereby certified that error appears in the printed specification of the above numbered patent requiring correction as follows: Page 2, first column, line 41, for the words "perspective view" read --side elevational view, partly in section,--; page 3, first column, lines 59, 60 and 63 respectively, for "number" read --row--; page 5, first column, line 7, beginning with "In" strike out all to and including "operator" in line 10 and insert instead --With the contacts T1 open, the circuit passing through the magnet A will remain open and feeding of the tape T will be prevented--; line 14, strike out "cause the apparatus to function indefinitely, but which if open will cause termination of the apparatus" and insert instead --render the contacts T9 ineffective, but which if open will allow these latter contacts to open the motor circuit--; page 7, second column, line 12, for the word "high" read --higher--; and that the said Letters Patent should be read with this correction therein that the same may conform to the record of the case in the Patent Office.

Signed and sealed this 5th day of February, A. D. 1946.

Leslie Frazer (Seal)　　　　　　　　　　　　First Assistant Commissioner of Patents.

the operator will line up the same before machine operations are started so that the highest digit of the account number is in register with the first row of brushes 12. Subsequently, the switches S1 and S3 will be manually closed to set the machine into operation.

The invention is not to be limited to the exact arrangement of structure shown in the accompanying drawings or described in this specification as various changes in the details of construction may be resorted to without departing from the spirit of the invention. Only insofar as the invention has particularly been pointed out in the accompanying claim is the same to be limited.

What is claimed is:

In an apparatus for selecting stored data which is computed according to a prearranged schedule for a plurality of multi-digit numbers, a plurality of work circuits, a plurality of data storing devices each having means for storing data according to the prearranged schedule and corresponding to one of said numbers, said devices being arranged for cross-selection in vertical and horizontal rows, selecting means including a horizontal bank of electromagnets for selecting a vertical row of said devices and a vertical bank of electromagnets for selecting a horizontal row of said devices, said horizontal bank of magnets being arranged electrically for cross-selection in groups and said vertical bank of magnets also being arranged electrically for cross-selection in groups, means for reading the initial multi-digit members, means controlled by said reading means for selecting a magnet in one of said banks according to two high decimal order digits of the number read by the reading means, means for selecting a magnet in another of said banks thereof according to two digits of relatively lower decimal orders of the number read, and means for selectively closing said work circuits in accordance with the precomputed data stored in the device which is selected by virtue of cross-selection by the selected magnets in each group.

WARD LEATHERS.
JERRIER HADDAD.

---

CERTIFICATE OF CORRECTION.

Patent No. 2,386,482.

October 9, 1945.

WARD LEATHERS, ET AL.

It is hereby certified that error appears in the printed specification of the above numbered patent requiring correction as follows: Page 2, first column, line 41, for the words "perspective view" read --side elevational view, partly in section,--; page 3, first column, lines 59, 60 and 63 respectively, for "number" read --row--; page 5, first column, line 7, beginning with "In" strike out all to and including "operator" in line 10 and insert instead --With the contacts T1 open, the circuit passing through the magnet A will remain open and feeding of the tape T will be prevented--; line 14, strike out "cause the apparatus to function indefinitely, but which if open will cause termination of the apparatus" and insert instead --render the contacts T9 ineffective, but which if open will allow these latter contacts to open the motor circuit--; page 7, second column, line 12, for the word "high" read --higher--; and that the said Letters Patent should be read with this correction therein that the same may conform to the record of the case in the Patent Office.

Signed and sealed this 5th day of February, A. D. 1946.

Leslie Frazer (Seal)

First Assistant Commissioner of Patents.